(12) United States Patent
Huang et al.

(10) Patent No.: US 12,165,673 B2
(45) Date of Patent: *Dec. 10, 2024

(54) METHOD AND APPARATUS FOR PROVIDING NOISE SUPPRESSION TO AN INTELLIGENT PERSONAL ASSISTANT

(71) Applicant: Universal Electronics Inc., Scottsdale, AZ (US)

(72) Inventors: Haiming Huang, Irvine, CA (US); Michael Courtney, Scottsdale, AZ (US); Jan van Ee, Scottsdale, AZ (US); Khanh Nguyen, Scottsdale, AZ (US); Jeremy Mickelsen, Scottsdale, AZ (US); Arsham Hatambeiki, Scottsdale, AZ (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,748

(22) Filed: Sep. 13, 2023

(65) Prior Publication Data

US 2024/0005949 A1 Jan. 4, 2024

Related U.S. Application Data

(63) Continuation of application No. 17/710,080, filed on Mar. 31, 2022, now Pat. No. 11,790,938, which is a
(Continued)

(51) Int. Cl.
*G10L 25/84* (2013.01)
*G01S 3/02* (2006.01)
(Continued)

(52) U.S. Cl.
CPC ............... *G10L 25/84* (2013.01); *G01S 3/02* (2013.01); *G10L 15/22* (2013.01); *H04R 1/406* (2013.01);
(Continued)

(58) Field of Classification Search
CPC ......... G10L 2015/088; G10L 2015/223; G10L 15/00; G10L 15/20; G10L 15/22;
(Continued)

(56) References Cited

U.S. PATENT DOCUMENTS 6,469,657 B1 10/2002 Fox
6,931,373 B1 * 8/2005 Bhaskar ............... G10L 19/08
704/219
(Continued)

FOREIGN PATENT DOCUMENTS

CN 107665714 A 2/2018
EP 3373602 A1 9/2018

OTHER PUBLICATIONS

Lee et al., Using Sonar for Liveness Detection to Protect Smart Speakers against Remote Attackers, Mar. 31, 2020, 28 pages.
(Continued)

*Primary Examiner* — Mohammad K Islam
(74) *Attorney, Agent, or Firm* — Greenberg Traurig, LLP

(57) ABSTRACT

A radio frequency connection between a far field voice detection device and a further device is used to determine a first angular direction from the far field voice detection device to the further device. The determined first angular direction is then used to emphasize, during a noise processing of a plurality of sounds received via use of a plurality of microphones of the far field voice detection device, a first one of the plurality of sounds relative to a remainder of the plurality of sounds.

18 Claims, 4 Drawing Sheets

Related U.S. Application Data continuation of application No. 16/858,011, filed on Apr. 24, 2020, now Pat. No. 11,335,361.

(51) Int. Cl.
  *G10L 15/08* (2006.01)
  *G10L 15/22* (2006.01)
  *H04R 1/40* (2006.01)

(52) U.S. Cl.
  CPC .. *G10L 2015/088* (2013.01); *G10L 2015/223* (2013.01)

(58) Field of Classification Search
  CPC ..... G10L 21/0232; G10L 25/21; G10L 25/84; G10L 21/0208; G10L 25/00; G06N 3/08; G01S 3/02
  See application file for complete search history.

(56) References Cited

U.S. PATENT DOCUMENTS

| | | | |
|---|---|---|---|
| 6,963,833 B1* | 11/2005 | Singhal | G10L 25/90 704/207 |
| 6,996,523 B1* | 2/2006 | Bhaskar | G10L 19/097 704/219 |
| 7,058,572 B1* | 6/2006 | Nemer | G10L 21/0208 704/226 |
| 7,092,881 B1* | 8/2006 | Aguilar | G10L 19/093 704/207 |
| 8,280,724 B2* | 10/2012 | Chazan | G10L 13/08 704/206 |
| 8,670,981 B2* | 3/2014 | Vos | G10L 19/07 704/205 |
| 8,964,998 B1* | 2/2015 | McClain | H03G 3/32 381/57 |
| 9,219,973 B2* | 12/2015 | Muesch | G10L 21/0208 |
| 9,530,423 B2* | 12/2016 | Vos | G10L 19/03 |
| 9,830,913 B2* | 11/2017 | Thomsen | H04R 3/005 |
| 9,947,333 B1 | 4/2018 | David | |
| 9,978,391 B2* | 5/2018 | Chen | G10L 25/21 |
| 10,249,315 B2* | 4/2019 | Qi | G10L 19/00 |
| 10,339,961 B2* | 7/2019 | Zhu | G10L 21/038 |
| 10,553,236 B1* | 2/2020 | Ayrapetian | G10L 25/84 |
| 10,573,312 B1* | 2/2020 | Thomson | G10L 15/187 |
| 10,755,718 B2* | 8/2020 | Ge | G10L 17/18 |
| 10,755,728 B1* | 8/2020 | Ayrapetian | G10L 21/0232 |
| 11,125,848 B2* | 9/2021 | Knaappila | G01S 5/0226 |
| 2009/0195454 A1* | 8/2009 | Apostolos | G01S 5/04 342/375 |
| 2011/0264447 A1* | 10/2011 | Visser | G10L 25/78 704/208 |
| 2011/0274291 A1 | 11/2011 | Tashev et al. | |
| 2012/0134507 A1 | 5/2012 | Dimitriadis | |
| 2013/0141221 A1* | 6/2013 | Oksanen | H04R 25/407 340/10.5 |
| 2014/0270194 A1 | 9/2014 | Des Jardins | |
| 2015/0255085 A1* | 9/2015 | Yamabe | G10L 21/0208 704/226 |
| 2015/0365762 A1 | 12/2015 | Truon et al. | |
| 2016/0064008 A1* | 3/2016 | Graham | G10L 21/0208 704/227 |
| 2016/0157013 A1 | 6/2016 | Kim et al. | |
| 2016/0241955 A1 | 8/2016 | Thyssen et al. | |
| 2016/0284346 A1* | 9/2016 | Visser | G10L 25/30 |
| 2016/0336015 A1* | 11/2016 | Pandey | H04R 25/505 |
| 2017/0094437 A1* | 3/2017 | Kadri | H04R 27/00 |
| 2017/0178664 A1 | 6/2017 | Wingate | |
| 2018/0018964 A1* | 1/2018 | Reilly | G10L 15/22 |
| 2018/0040333 A1* | 2/2018 | Wung | G10L 21/0232 |
| 2018/0350357 A1 | 12/2018 | Pandey | |
| 2018/0366138 A1* | 12/2018 | Ramprashad | G10L 21/0208 |
| 2019/0033420 A1* | 1/2019 | Knaappila | G01S 3/023 |
| 2019/0069080 A1 | 2/2019 | Abrams | |
| 2019/0098070 A1* | 3/2019 | Kim | G02B 27/01 |
| 2019/0139552 A1 | 5/2019 | Kim et al. | |
| 2019/0182607 A1 | 6/2019 | Pedersen et al. | |
| 2019/0311718 A1 | 10/2019 | Huber et al. | |
| 2019/0313187 A1 | 10/2019 | Stoltze et al. | |
| 2019/0349677 A1 | 11/2019 | Mate | |
| 2020/0103486 A1* | 4/2020 | Knaappila | G01S 5/04 |
| 2021/0141467 A1 | 5/2021 | Hur et al. | |

OTHER PUBLICATIONS

ISA/US, International Search Report and Written Opinion issued on PCT application No. PCT/US2021/026346, dated Jul. 20, 2021, 9 pages.

Extended EP Search Report issued in appl. No. 21792203.8, dated Aug. 22, 2023, 12 pgs.

* cited by examiner

METHOD AND APPARATUS FOR PROVIDING NOISE SUPPRESSION TO AN INTELLIGENT PERSONAL ASSISTANT

RELATED APPLICATION INFORMATION

This application claims the benefit of U.S. application Ser. No. 17/710,080, filed on Mar. 31, 2022, which application claims the benefit of U.S. application Ser. No. 16/858,011, filed on Apr. 24, 2020, the disclosure of which is incorporated herein by reference in its entirety.

BACKGROUND

Far field voice detection devices (also known as intelligent personal assistants) are becoming commonplace in today's homes. Products such as "Amazon's Echo," "Google's Google Home," and "Apple's Siri" are all examples of these devices. Typically, such devices are installed at home, coupled to an existing home Wi-Fi network and placed in a convenient location where they may be used most frequently, such as in a family room or kitchen. An example of a far field voice detection device system is described in U.S. Pat. No. 9,947,333, the disclosure of which is incorporated herein by reference in its entirety.

Whether embodied as a stand-alone device or embedded into another device, a far field voice detection device generally listens for a wake-word to be spoken, such as "Alexa" for "Amazon's Echo" and "OK Google" for "Google's Home." The wake-word is typically followed by a question or a command. The question or command that follows the wake-word is captured by the device and is usually sent over the Internet to a voice recognition service that interprets the question or command and provides a response that is sent back over the Internet to the assistant (and/or to another designated device) for verbal playback (via a speaker that is typically integrated into each device) and/or for causing some commandable action to occur (such as lighting lights, playing music, etc.).

While such devices generally work for their intended purpose, it is desired to, among other things, provide far field voice detection devices with a noise suppression capability.

SUMMARY

The following describes a system and method for providing a noise suppression capability to far field voice detection devices.

In a first described example, a radio frequency connection between a far field voice detection device and a further device (such as a remote control or a television) is used to determine a first angular direction from the far field voice detection device to the further device. The determined first angular direction is then used to emphasize, during a noise processing of a plurality of sounds received via use of a plurality of microphones of the far field voice detection device, a first one of the plurality of sounds relative to a remainder of the plurality of sounds.

In a second described example, radio frequency connections between each of the plurality of far field voice detection devices and a remote control device are used to determine a one of the plurality of far field voice detection devices the remote control device is being pointed at. During a noise processing of a plurality of sounds received via use of the plurality of far field voice detection devices, a one of the plurality of sounds received via the determined one of the plurality of far field voice detection devices is then emphasized A better understanding of the objects, advantages, features, properties and relationships of the hereinafter disclosed system and method for providing a noise suppression capability to far field detections devices will be obtained from the following detailed description and accompanying drawings which set forth illustrative embodiments and which are indicative of the various ways in which the principles of the described systems and methods may be employed.

BRIEF DESCRIPTION OF THE DRAWINGS

The features, advantages, and objects of the subject disclosure will become more apparent from the detailed description as set forth below, when taken in conjunction with the drawings in which like referenced characters identify correspondingly throughout, and wherein.

DETAILED DESCRIPTION

Figure 1:
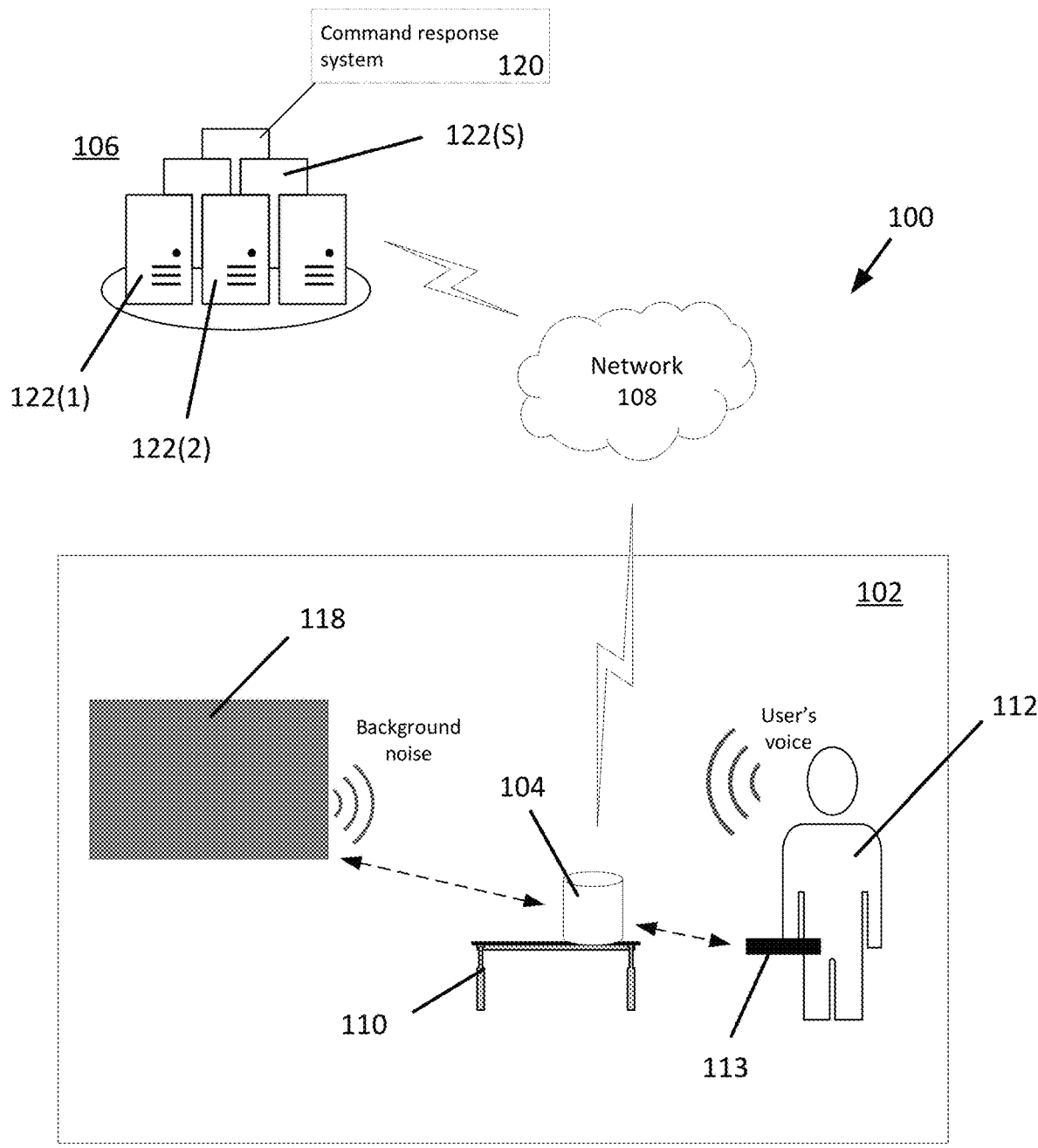
FIG. 1 illustrates example elements of a far field voice detection system.

By way of example only, FIG. 1 shows a far field voice detection system 100 including a far field voice detection device 104. The far field voice detection device 104 is set in an exemplary home environment in which the far field voice detection device 104 is physically situated in a room of the home 102. The far field voice detection device 104 is communicatively coupled to one or more cloud-based services 106 over a network 108. The network 108 may include a local area network as well as a wide area network.

In the illustrated example, the far field voice detection device 104 is depicted as a stand-alone device that is positioned on a table 110 within the home 102. In other examples, the far field voice detection device 104 may be placed in any number of locations and/or the far field voice detection device 104 may be integrated into other devices within the home, such as a television, media streaming device, or the like. Further, more than one far field detection device 104 may be positioned in a single room or environment, or one far field detection device 104 may be used to accommodate user interactions from more than one room.

Generally, the far field voice detection device 104 has at least a plurality of microphones and a speaker to facilitate audio interactions with a user 112. The far field voice detection device 104 may additionally include, as needed for any purpose, a keyboard, a keypad, a touch screen, a joystick, control buttons, a display, and/or the like. In certain implementations, a limited set of one or more input elements may be provided. For example, the far field voice detection device 104 may include a dedicated button to initiate a configuration process, to power on/off the device, to control output volume levels, etc. Nonetheless, the primary (and potentially only) mode of user interaction with the far field voice detection device 104 is through voice input and audible and/or command transmission output.

As noted, the plurality of microphones 214 of the far field detection device 104 are provided to detect words and sounds uttered from the user 112. Typically, the far field voice detection device 104 uses the microphones 214 to listen for a predefined wake-word and, after the predefined wake-work is detected, the far field voice detection device 104 uses the microphones 214 to listen for (and capture) questions and/or commands that are subsequently uttered from the user 112. Generally, the questions and/or commands that are received by the far field voice detection device 104 are transmitted over the network 108 to the cloud services 106 for interpretation and subsequent action.

In FIG. 1, the user 112 is shown in a room of the home 102. As will be appreciated, the ambient conditions of the room 102 (or any other location in which the far field voice detection device 104 is located) may introduce other audio signals that form background noise for the far field voice detection device 104. For example, a television 118 may emit background audio that includes voices, music, special effects soundtracks, and the like that may obscure the voice utterances being spoken by the user 112. As will be described in greater detail hereinafter, the far field voice detection device 104 is provided with a noise suppression capability to address the problems associated with such background noise.

The far field voice detection device 104 may be communicatively coupled to the network 108 via use of wired technologies (e.g., wires, USB, fiber optic cable, etc.), via use of wireless technologies (e.g., RF, cellular, satellite, Bluetooth, etc.), and/or via use of other connection technologies. The network 108 is representative of any type of communication network, including a data and/or voice network, and may be implemented using a wired infrastructure (e.g., cable, CAT5, fiber optic cable, etc.), a wireless infrastructure (e.g., RF, cellular, microwave, satellite, Bluetooth, etc.), and/or other connection technologies. The network 108 carries data, such as audio data, between the cloud services 106 and the far field voice detection device 104.

As known in the art, the cloud services 106 generally refer to a network accessible platform implemented as a computing infrastructure of processors, storage, software, data access, and so forth that is maintained and accessible via a network such as the Internet. In the illustrated, example system 100, the cloud services 106 include a command response system 120 that is implemented by one or more servers, such as servers 122(1), 122(2), . . . 122(S). The servers 122(1)-(S) may host any number of applications that can process the user input received from the far field voice detection device 104, and produce a suitable response. These servers 122(1)-(S) may be arranged in any number of ways, such as server farms, stacks, and the like that are commonly used in data centers. One example implementation of the command response system 120 is described below in more detail with reference to FIG. 3.

Figure 2:
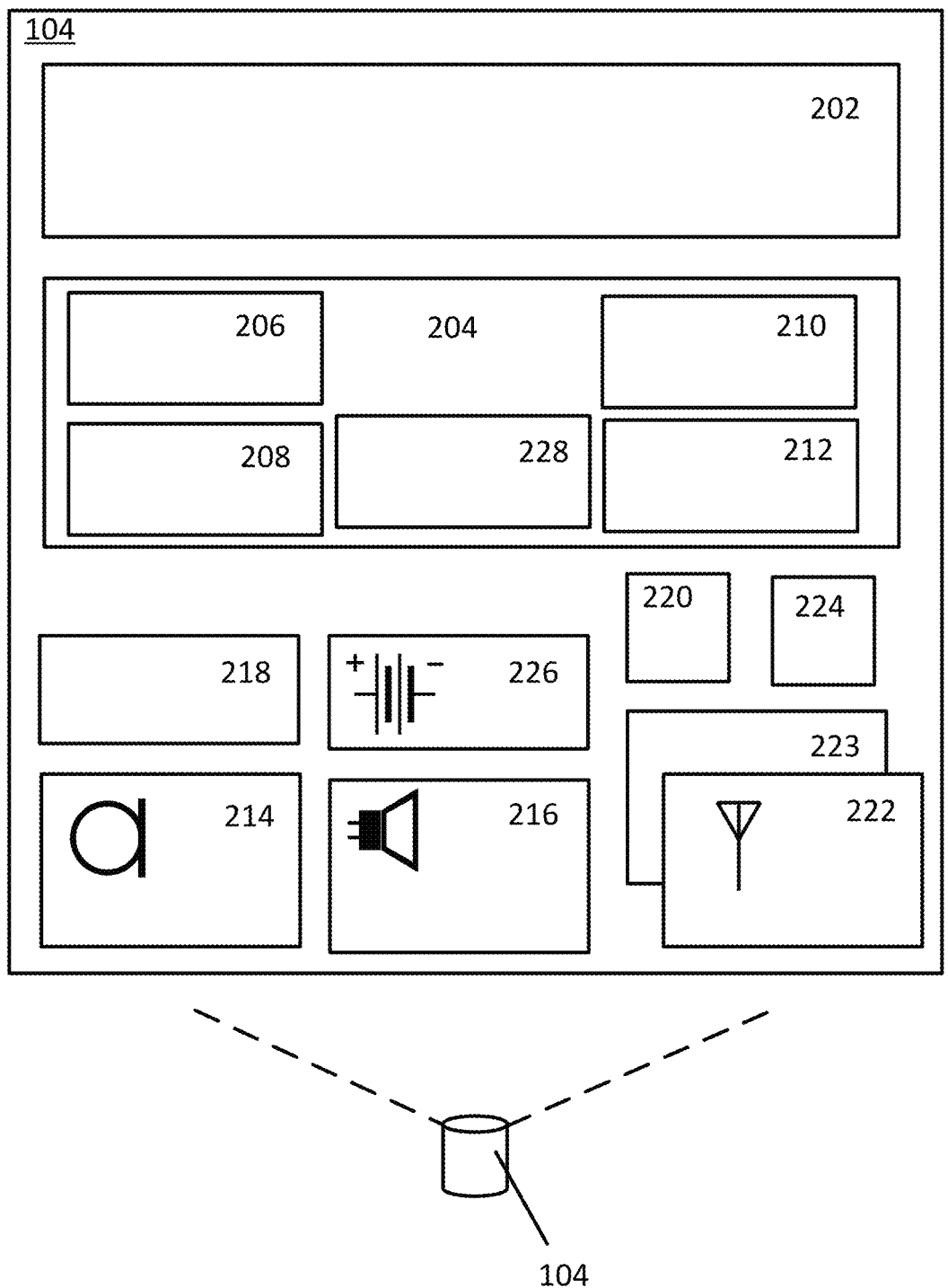
FIG. 2 illustrates example elements of a far field voice detection device of FIG. 1.

As shown in FIG. 2, selected functional components of an example far field voice detection device 104 are illustrated. In the illustrated example, the far field voice detection device 104 includes a processor 202 and memory 204. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., a wireless unit, a USB unit, a Codec unit) within and coupled to the far field voice detection device 104. The far field voice detection device 104 may also include a speech recognition module 208 to provide some basic speech recognition functionality. In some implementations, this functionality may be limited to specific commands that perform fundamental tasks like waking up the device, configuring the device, cancelling an input, and the like. The amount of speech recognition capabilities implemented on the far field voice detection device 104 is an implementation detail, but the architecture described herein supports having some speech recognition at the local far field voice detection device 104 together with more expansive speech recognition at the cloud services 106. A configuration module 212 may also be provided to assist in an automated initial configuration of the far field voice detection device 104 (e.g., to find a wifi connection, to enter login information, to link the far field voice detection device 104 to other devices, etc.) to enhance the user's out-of-box experience, as well as reconfigure the device at any time in the future. The far field voice detection device 104 will additionally include a noise suppression module 210 as noted previously.

In addition to the plurality of microphones 214 to receive audio input, such as user voice input, the far field voice detection device 104 may have one or more speakers 216 to output audio sounds. A codec 218 may be coupled to the microphones 214 and the speaker 216 to encode and/or decode the audio signals as needed. The codec may convert audio data between analog and digital formats. A user may interact with the assistant 104 by speaking to it, and the microphones 214 capture the user speech. The codec 218 encodes the user speech and transfers that audio data to other components. The assistant 104 can communicate back to the user by emitting audible statements through the speaker 216. In this manner, the user may interact with the voice controlled assistant simply through speech.

In the illustrated example, the far field voice detection device 104 includes a wireless unit 220 coupled to an antenna 222 to facilitate a wireless connection to a network, e.g., a home router, and an antenna 223 to facilitate a wireless connection to one or more other devices in the environment. The wireless unit 220 may implement one or more of various wireless technologies, such as wifi, Bluetooth (BLE), RF, and so on. For purposes that will be explained in greater detail hereinafter, the far field voice detection device 104 is specifically designed to support RF direction finding functionality via use of the wireless unit 220 and antenna 223. To this end, the far field voice detection device 104 and/or other devices in communication with the device 104 may support Bluetooth (e.g., Bluetooth v 5.1) and may use an antenna 223 that will allow the far field voice detection device 104 and/or the other devices to support direction finding functionality such as angle of arrival ("AoA") direction finding functionality and/or angle of departure ("AoD") direction finding functionality. It will be appreciated that devices that are intended to communicate with the far field voice detection device 104 may equally be provisioned with any hardware and software needed to support such direction finding functionality.

More particularly, the AoA method is used to determine a position of a RF transmitting device, e.g., a device having a transmitting BLE transceiver. The transmitting device sends packets that are received by the antenna 223 which, for use in this instance, would be in the form of a multi-antenna array. The receiving device samples data from the signal packets while switching between each active antenna in the array. By doing so the receiving device detects the phase difference of the signal due to the difference in distance from each antenna in the array to the signal transmitting antenna. The positioning engine then uses the phase difference information to determine the angle from which the signals were received and hence the direction of the transmitting device relative to the receiving device.

In the AoD method, the device with the antenna array sends a signal via each of its antennas. As each signal from the antennas in the array arrives at the receiver's single antenna, it is phase shifted from the previous signal due to the different distance the signal has travelled from the transmitter. The receiving device can then use the data to determine the angle from which the signals were received and thereby the direction of the transmitting device relative to the receiving device.

As additionally illustrated in FIG. 2, a USB port 224 may further be provided as part of the far field voice detection device 104 to facilitate a wired connection to a network or a plug-in network device that communicates with other wireless networks. In addition to the USB port 224, or as an alternative thereto, other forms of wired connections may be employed, such as a broadband connection, an HDMI connection, etc. A power unit 226 is further provided to distribute power to the various components on the far field voice detection device 104.

The far field voice detection device 104 may also include a command transmission unit 228 which command transmission unit 228 will operate, in connection with antennas 222, 223, USB port 224, and/or other transmissions devices (such as an IR transmitter, a power line transmitter, etc.), to cause appropriate commands to be issued to one or more target appliances to thereby control functional operations of such target appliances, e.g., to turn on a television, to turn off a light, etc. A far field voice detection device having such control capabilities is described in U.S. Application No. 16/717,546, the disclosure of which is incorporated herein by reference in its entirety.

Figure 3:
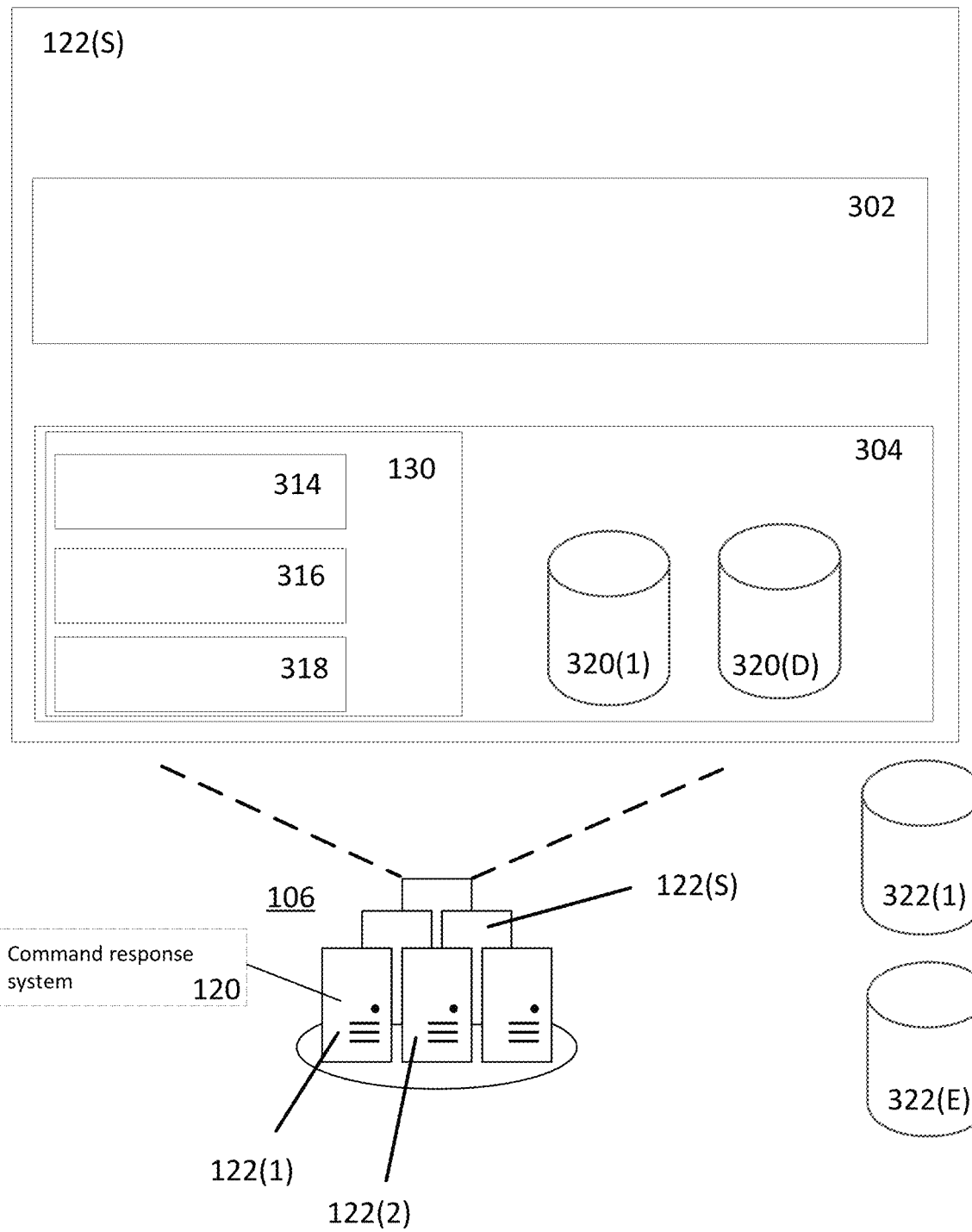
FIG. 3 illustrates example elements of a command response system of FIG. 1.

FIG. 3 shows selected functional components of a server architecture implemented by the command response system 120 as part of the cloud services 106 of FIG. 1. The command response system 120 includes one or more servers, as represented by servers 122(1)-(S). The servers collectively comprise processing resources, as represented by processors 302, and memory 304. The memory 304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In the illustrated implementation, a command processing module 130 is shown as software components or computer-executable instructions stored in the memory 304 and executed by one or more processors 302. The command processing module 130 generally includes an optional speech recognition engine 314, a command handler 316, and a response encoder 318. The speech recognition engine 314 converts the user command to a text string. In this text form, the user command can be used in search queries, or to reference associated responses, or to direct an operation, or to be processed further using natural language processing techniques, or so forth. In other implementations, the user command may be maintained in audio form, or be interpreted into other data forms.

The user command is passed to a command handler 316 in its raw or a converted form, and the handler 316 performs essentially any operation that might use the user command as an input. As one example, a text form of the user command may be used as a search query to search one or more databases, such as internal information databases 320(1)-320(D) or external third part data providers 322(1)-322(E). Alternatively, an audio command may be compared to a command database (e.g., one or more information databases 320(1)-(D)) to determine whether it matches a predefined command. If so, the associated action or response may be retrieved. In yet another example, the handler 316 may use a converted text version of the user command as an input to a third party provider (e.g., providers 322(1)-(E)) for conducting an operation, such as a financial transaction, an online commerce transaction, and the like.

Any one of these many varied operations may produce a response. When a response is produced, the response encoder 318 encodes the response for transmission back over the network 108 to the far field voice detection device 104. In some implementations, this may involve converting the response to audio data that can be played at the assistant 104 for audible output through the speaker to the user or to command data that can be transmitted to a target appliance via use of a transmission protocol recognizable by the target appliance.

As noted above, because the far field voice detection device 104 is located in a room, other ambient noise may be introduced into the environment that is unintended for detection by the far field voice detection device 104. The background noise may be human voices, singing, music, movie sound tracks, gaming sound effects, and the like. In the FIG. 1 illustration, one common source of background noise is the TV 118. Background noise introduced by the TV 118 is particularly problematic because the noise includes spoken words from characters that may be picked up by the far field voice detection device 104. In addition to the TV, other devices (e.g., radio, DVC player, computer, etc.) may emit voice or other human sounds, music, sound tracks, game sound effects, and other sounds that might potentially interfere with the user's interaction with the far field voice detection device 104.

Figure 4:
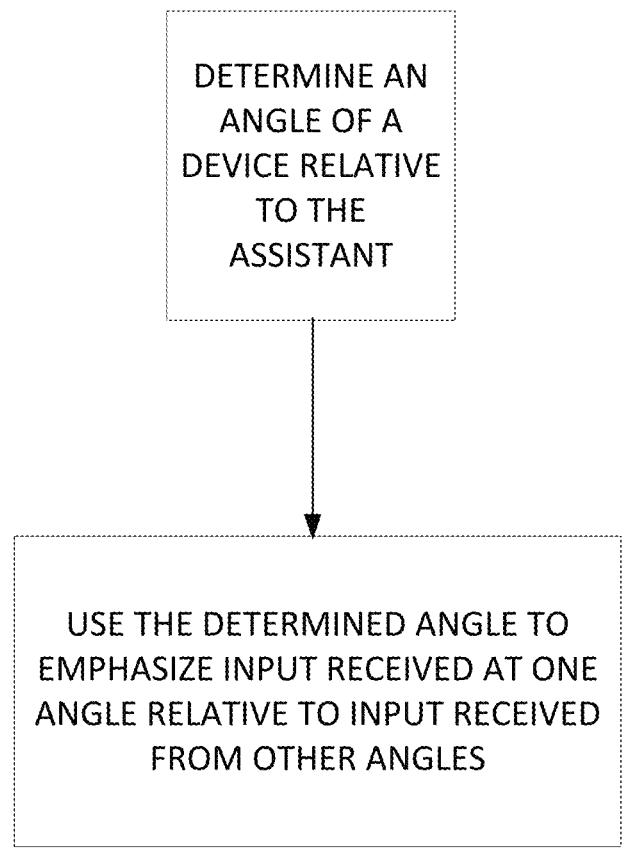
FIG. 4 illustrates example steps performed by the far field voice detection device of FIG. 2 to provide a noise suppression capability to the far field voice detection device.

To address this interference problem, the far field voice detection device system will execute a process, generally illustrated in FIG. 4, which process will provide the far filed voice detection device 104 with a noise suppression capability. In this regard, the processes that is illustrated in FIG. 4, may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

More particularly, to provide noise suppression, the system may utilize a BLE connection between the far field voice detection device 104 and another device, such as a remote control device 113, to determine or at least estimate where a user is relative to the far field voice detection device 104. In this example, it is assumed that the user that is talking to the far field voice detection device 104 is holding or otherwise proximate to the remote control. Thus, by having the far field voice detection device 104 and/or the remote control device 113 use AoA and/or AoD to determine a location of the far filed voice detection device 104 relative to remote control device 113, the far field voice detection device 104 can determine an incoming angle of any input received by the microphones 214 and the system can give priority for voice processing to that input that has a determined incoming angle that most closely matches the angle of the far field voice detection device 104 relative to the remote control 104 as determined via use of AoA and/or AoD.

In another example, the system may utilize a BLE connection between the far field voice detection device 104 and a TV 118 (or other known sound generating device) to determine or at least estimate where noise is most likely being generated. Thus, by having the far field voice detection device 104 and/or the TV 118 use AoA and/or AoD to determine a location of the far field voice detection device 104 relative to TV 118, the far field voice detection device 104 can determine an incoming angle of any input received by the microphones 214 and the system can give less priority to (or ignore) for voice processing that input that has a determined incoming angle that most closely matches the angle of the far field voice detection device 104 relative to the TV 118 as determined via use of AoA and/or AoD.

It will be appreciated that the determination of the position of the far field voice detection device 104 relative to another device for use as described above by the system can be performed in response to the system detecting a wake-word, periodically while the system is awake, in response to far field voice detection device 104 being turned on, during the configuration process of the far field voice detection device 104, etc.

In a still further example, in a system having multiple far field voice detection devices 104, the system can select one of the far field voice detection device 104 to use when capturing voice input for processing. In this example, the remote control 113 is again used as a reference for determining which one of the far field voice detection devices 104 to select. To this end, the remote control 113 can use AoA processing to identify the one of the far filed voice detections devices 104 the remote control 113 is pointing towards and the selected device 104 can be instructed to be the device that is to capture input for processing by the system.

It will be appreciated that the one of the plurality of far field voice detection devices the remote control device is being pointed at can be determined in response to a detected utterance of a wake-word, in response to a detected interaction with the remote control device (e.g., activation of an input element of the remote control device, etc.), periodically, and the like without limitation.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory, computer-readable media having instructions stored thereon, the instructions, when executed by a far field voice detection device, causing the far field voice detection device to perform steps, comprising:
   using a radio frequency connection between the far field voice detection device and a further device to determine a first angular direction to the far field voice detection device from the further device; and
   using the determined first angular direction to deemphasize, during a noise processing of a plurality of sounds received via use of a plurality of microphones of the far field voice detection device, sound having an incoming angular direction to the far filed voice detection device that most closely corresponds to the determined first angular direction relative to a remainder of the plurality of sounds.

2. The non-transitory, computer-readable media as recited in claim 1, wherein the first angular direction to the far field voice detection device from the further device is determined via use of an angle of arrival direction finding methodology.

3. The non-transitory, computer-readable media as recited in claim 1, wherein the first angular direction to the far field voice detection device from the further device is determined via use of an angle of departure direction finding methodology.

4. The non-transitory, computer-readable media as recited in claim 1, wherein the further device comprises a television.

5. The non-transitory, computer-readable media as recited in claim 1, wherein the further device comprises an audio output device.

6. The non-transitory, computer-readable media as recited in claim 1, wherein the sound having the incoming angular direction to the far filed voice detection device that most closely corresponds to the determined first angular direction is deemphasized by being ignored.

7. The non-transitory, computer-readable media as recited in claim 1, wherein the first angular direction to the far field voice detection device from the further device is caused to be determined in response to a detected utterance of a wake-word.

8. The non-transitory, computer-readable media as recited in claim 1, wherein the first angular direction to the far field voice detection device from the further device is caused to be determined in response to a powering on of the far field voice detection device.

9. The non-transitory, computer-readable media as recited in claim 1, wherein the first angular direction to the far field voice detection device from the further device is caused to be periodically determined.

10. A far field voice detection device, comprising:
- a radio frequency receiver for providing a radio frequency connection between the far field voice detection device and a further device;
- a processing device;
- a plurality of microphones; and
- a memory having instructions stored thereon, the instructions, when executed by the processing device, causing the far field voice detection device to perform steps, comprising:
- using the radio frequency connection between the far field voice detection device and the further device to determine a first angular direction to the far field voice detection device from the further device; and
- using the determined first angular direction to deemphasize, during a noise processing of a plurality of sounds received via use of a plurality of microphones of the far field voice detection device, sound having an incoming angular direction to the far filed voice detection device that most closely corresponds to the determined first angular direction relative to a remainder of the plurality of sounds.

11. The far field voice detection device as recited in claim 10, wherein the first angular direction to the far field voice detection device from the further device is determined via use of an angle of arrival direction finding methodology.

12. The far field voice detection device as recited in claim 10, wherein the first angular direction to the far field voice detection device from the further device is determined via use of an angle of departure direction finding methodology.

13. The far field voice detection device as recited in claim 10, wherein the further device comprises a television.

14. The far field voice detection device as recited in claim 10, wherein the further device comprises an audio output device.

15. The far field voice detection device as recited in claim 10, wherein the sound having the incoming angular direction to the far filed voice detection device that most closely corresponds to the determined first angular direction is deemphasized by being ignored.

16. The far field voice detection device as recited in claim 10, wherein the first angular direction to the far field voice detection device from the further device is caused to be determined in response to a detected utterance of a wake-word.

17. The far field voice detection device as recited in claim 10, wherein the first angular direction to the far field voice detection device from the further device is caused to be determined in response to a powering on of the far field voice detection device.

18. The far field voice detection device as recited in claim 10, wherein the first angular direction to the far field voice detection device from the further device is caused to be periodically determined.

* * * * *